United States Patent Office 2,726,242
Patented Dec. 6, 1955

2,726,242
PREPARATION OF ANTHRAQUINONE DIACRIDONES

Lynne H. Ulich, Woodstown, N. J., assignor to E. I. du Pont de Nemours and Company, Wilmington, Del., a corporation of Delaware No Drawing. Application May 11, 1954,
Serial No. 429,105

5 Claims. (Cl. 260—276)

This application is a continuation-in-part of my co-pending application S. N. 290,573, filed May 28, 1952, now abandoned.

This invention relates to the preparation of anthraquinone diacridones from 1,5-dianilido-o,o'-dicarboxylic acid by ring closure, and more particularly by ring closure with benzoyl chloride and phosphoric acid.

Heretofore, ring closure of anilido anthraquinones to acridones for use as a vat has been accomplished by several different processes. In U. S. Patent 961,048 to Ullmann, ring closing was effected by the use of sulfuric acid or by treating the anthraquinone dianilido carboxylic acid with phosphorus pentachloride, and then closing the ring with aluminum chloride. In U. S. Patent 2,449,011, a method is disclosed for ring closure to form acridones in which sulfuric acid is also used. This method, however, has the disadvantage that considerable sulfonation of the aromatic ring takes place with a correspondingly reduced yield. It will be apparent, therefore, that a method which produces the diacridone without undesirable side reactions or sulfonations would be highly desirable.

It is therefore an object of the present invention to provide an improved economical process for converting anthraquinone-1,5-dianilido-o,o'-dicarboxylic acid to the corresponding anthraquinone diacridone. Another object is to provide a process of carrying out this reaction without using sulfuric acid and the introduction of sulfonic groups in the aromatic rings. A still further object is a method for carrying out this reaction with a good yield of diacridone of high quality as a vat dye for cotton. Other objects will be apparent as the description of the invention proceeds.

These and other objects are accomplished by heating anthraquinone-1,5-dianilido-o,o'-dicarboxylic acid with benzoyl chloride and phosphoric acid in nitrobenzene at a temperature of about 150° to 170° C., and then isolating the anthraquinone diacridone. The process is carried out within rather critical molar ratios, namely one mol of anthraquinone-1,5-dianilido-o,o'-dicarboxylic acid, from 3.3 to 4.0 mols of benzoyl chloride, and from about 0.20 to 0.70 mol of phosphoric acid. The molar ratio of phosphoric acid to the anthraquinone carboxylic acid is particularly critical. Less than about 0.20 mol produces low yields, and more than 0.70 mol of phosphoric acid results in an inferior dye. The preferred ratio of phosphoric acid is about 0.45 mol per mol of anthraquinone-1,5-dianilido-o,o'-dicarboxylic acid, and this molar ratio yields about 80% to 85% of the theoretical yield of the diacridone.

The benzoyl chloride is also essential in the amount indicated for high yields of diacridone. If a lower boiling acid chloride such as thionyl chloride is used, the acylation to the dicarboxylic acid chloride must be carried out at temperatures around 70° to 75° C., and then the reaction mass must be heated to about 160° to 170° C. to complete the ring closure.

The preferred solvent is nitrobenzene, although it has been found that trichlorobenzene is also effective and is the full equivalent of nitrobenzene. Other solvents in which the reactants and reaction product are soluble, and which are inert to the reactants and catalysts at 170° C., and which boil above this temperature, may likewise be used under some circumstances.

The following examples are given to illustrate the invention, but no limitation is intended to be placed thereon except as defined in the appended claims.

Example I 65.0 parts of anthraquinone-1,5-dianilido-o,o'-dicarboxylic acid of 97.5% purity is charged into an agitated and jacketed vessel containing 650 parts of dry nitrobenzene and 7.06 parts of 85% orthophosphoric acid (equivalent to 6.0 parts of 100% acid). The mass is agitated and heated to 140° to 150° C. for one hour to remove any free water. The mass is then heated to 160° C. and the temperature maintained while 62.1 parts of benzoyl chloride is added at a uniform rate over a period of two hours. The temperature is held at 150° to 160° C. for 6 hours while the mass is agitated. Gaseous hydrogen chloride is evolved as the reaction proceeds. The reaction mass is then cooled to 100° to 120° C. and filtered. The filter cake is washed with 650 parts of nitrobenzene at 80° to 100° C. The last wash liquor is only slightly pink.

The filter cake is transferred to a steam distillation vessel, sufficient sodium carbonate is added to make the mass alkaline and it is steam distilled until no more nitrobenzene distills off. The charge left in the still is then filtered and washed with hot water until it is free of alkali. The filter cake is dried at 100° to 105° C. There results 48 parts of anthraquinone diacridone which is an 80% yield.

Examples II to VI

The process of Example I was repeated except that the amount of phosphoric acid was varied. The results are shown in the table below and the data of Example I are included for comparison.

| Example | Parts 100% H₃PO₄ | Mols H₃PO₄ per Mol Anthraquinone Dianilidodicarboxylic Acid | Mols Benzoyl Chloride per Mol Dianilidodicarboxylic Acid | Yield Percent of Theory |
|---|---|---|---|---|
| I | 6.0 | 0.46 | 3.34 | 80 |
| II | 3.0 | 0.23 | 3.57 | 77 |
| III | 9.0 | 0.69 | 3.98 | 80 |
| IV | 12.0 | 0.92 | 3.34 | 72 |
| V | 15.0 | 1.15 | 3.34 | 64 |
| VI | None | | 3.57 | 58 |

Example I represents the preferred embodiment of the invention and yields about 80% of the theoretical yield of the diacridone. This example was repeated without the phosphoric acid, and a yield of about 58% was obtained.

As indicated above, the preferred temperature of carrying out the reaction is within the range of about 150° to 170° C. When the temperature was lowered the yield dropped off.

The time of reaction is not particularly critical, but a range of 6 or 7 hours is preferred. Less than this time reflects a proportionately lower yield, and a longer time does not produce a commensurate increase in yield.

With respect to the benzoyl chloride, a ratio of about 3.3 to 3.5 mols per mol of the anthraquinone dianilidodicarboxylic acid is preferred, although this ratio may vary from 3.3 to 4.0 without any serious reduction in yield. When a molar ratio outside of this range is used, a reduction in the percentage yield of the diacridone will be found.

The present invention offers many advantages. For example, if sulfuric acid is used as a catalyst with nitrobenzene as a solvent at temperatures required for the formation of the diacridone in good yields, sulfonation of the aromatic rings occurs, together with a decrease in yield and with formation of tar and other discoloration. In the present invention these undesirable products are avoided. The anthraquinone diacridone prepared according to the present invention is a valuable vat dye, and when cotton is dyed with it by conventional methods, a violet color is obtained having excellent clarity.

It is apparent that many widely different embodiments of this invention may be made without departing from the spirit and scope thereof, and therefore, it is not intended to be limited except as indicated in the appended claims.

I claim:

1. The method of preparing anthraquinone diacridones which comprises heating in proportion one mol of anthraquinone-1,5-dianilido-o,o'-dicarboxylic acid with a ring closing agent consisting essentially of from 3.3 to 4.0 mols of benzoyl chloride, and from about 0.20 to 0.70 mol of phosphoric acid in nitrobenzene at 150° to 170° C. for at least six hours, and thereafter isolating the anthraquinone diacridone so produced.

2. The process of claim 1 in which the molar ratio of phosphoric acid is about 0.45.

3. The process of claim 1 in which the molar ratio of benzoyl chloride is about 3.5.

4. The process of claim 1 in which the temperature is from 160° to 165° C. and is maintained for about 6 to 7 hours.

5. The process which comprises heating about 65.0 parts of anthraquinone-1,5-dianilido-o,o'-dicarboxylic acid with 650 parts of nitrobenzene and 6 parts of orthophosphoric acid at a temperature of 140° to 150° C. for about an hour, increasing the temperature to 160° to 165° C. and maintaining this temperature while adding about 62.1 parts of benzoyl chloride slowly, maintaining the temperature for about 6 hours, cooling the reaction mass to about 100° to 120° C., filtering, and washing the filter cake with nitrobenzene at about 80° to 100° C., steam-distilling the washed filter cake to remove any occluded nitrobenzene, washing the retained charge, and thereafter drying at about 100° to 105° C.

References Cited in the file of this patent

UNITED STATES PATENTS

| | | |
|---|---|---|
| 961,048 | Ullmann | June 7, 1910 |
| 2,449,011 | Scalera et al. | Sept. 7, 1948 |
| 2,492,802 | Lecher et al. | Dec. 27, 1949 |
| 2,493,191 | Goldberg et al. | Jan. 3, 1950 |